US011236014B2

(12) United States Patent
Veerasamy et al.

(10) Patent No.: US 11,236,014 B2
(45) Date of Patent: Feb. 1, 2022

(54) COATED ARTICLE INCLUDING ULTRA-FAST LASER TREATED SILVER-INCLUSIVE LAYER IN LOW-EMISSIVITY THIN FILM COATING, AND/OR METHOD OF MAKING THE SAME

(71) Applicants: GUARDIAN GLASS, LLC, Auburn Hills, MI (US); GUARDIAN EUROPE S.A.R.L., Bertrange (LU)

(72) Inventors: Vijayen S. Veerasamy, Ann Arbor, MI (US); Bernd Disteldorf, Mettlach (DE)

(73) Assignees: GUARDIAN GLASS, LLC, Auburn Hills, MI (US); GUARDIAN EUROPE S.A.R.L., Bertrange (LU)

( * ) Notice: Subject to any disclaimer, the term of this patent is extended or adjusted under 35 U.S.C. 154(b) by 0 days.

(21) Appl. No.: 17/067,939

(22) Filed: Oct. 12, 2020

(65) Prior Publication Data
US 2021/0024410 A1    Jan. 28, 2021

Related U.S. Application Data

(62) Division of application No. 16/052,166, filed on Aug. 1, 2018, now Pat. No. 10,822,270.

(51) Int. Cl.
*C03C 17/36* (2006.01)
*E06B 3/67* (2006.01)
*E06B 9/24* (2006.01)

(52) U.S. Cl.
CPC ........ *C03C 17/366* (2013.01); *C03C 17/3626* (2013.01); *C03C 17/3639* (2013.01);
(Continued)

(58) Field of Classification Search
CPC .............. C03C 17/366; C03C 17/3626; C03C 17/3639; C03C 17/3644; C03C 17/3681;
(Continued)

(56) References Cited

U.S. PATENT DOCUMENTS 4,664,769 A    5/1987  Cuomo
5,156,894 A   10/1992  Hood
(Continued)

FOREIGN PATENT DOCUMENTS

CN    103889915 A    6/2014
CN    107056084 A    8/2017
(Continued)

OTHER PUBLICATIONS

International Preliminary Report on Patentability for International Application No. PCT/IB2019/056575, dated Feb. 11, 2021, 9 Pages.
(Continued)

*Primary Examiner* — Donald J Loney (57) ABSTRACT

Certain example embodiments relate to ultra-fast laser treatment of silver-inclusive (low-emissivity) low-E coatings, coated articles including such coatings, and/or associated methods. The low-E coating is formed on a substrate (e.g., borosilicate or soda lime silica glass), with the low-E coating including at least one sputter-deposited silver-based layer, and with each said silver-based layer being sandwiched between one or more dielectric layers. The low-E coating is exposed to laser pulses having a duration of no more than $10^{-12}$ seconds, a wavelength of 355-500 nm, and an energy density of more than 30 kW/cm$^2$. The exposing is performed so as to avoid increasing temperature of the low-E coating to more than 300 degrees C. while also reducing (a) grain boundaries with respect to, and vacancies in, each said silver-based layer, (b) each said silver-based layer's refractive index, and (c) emissivity of the low-E coating compared to its as-deposited form.

19 Claims, 6 Drawing Sheets

(52) U.S. Cl.
CPC ...... *C03C 17/3644* (2013.01); *C03C 17/3681* (2013.01); *E06B 3/6715* (2013.01); *E06B 9/24* (2013.01); *C03C 2217/228* (2013.01); *C03C 2217/256* (2013.01); *C03C 2217/281* (2013.01); *C03C 2218/154* (2013.01); *C03C 2218/32* (2013.01); *E06B 2009/2417* (2013.01); *Y02B 80/22* (2013.01)

(58) Field of Classification Search
CPC ........ C03C 2217/228; C03C 2217/256; C03C 2217/281; C03C 2218/154; C03C 2218/32

See application file for complete search history.

(56) References Cited

U.S. PATENT DOCUMENTS

| | | | |
|---|---|---|---|
| 5,306,547 | A | 4/1994 | Hood |
| 5,308,662 | A | 5/1994 | Woodard |
| 5,506,037 | A | 4/1996 | Termath |
| 5,514,476 | A | 5/1996 | Hartig |
| 5,557,462 | A | 9/1996 | Hartig |
| 5,784,853 | A | 7/1998 | Hood |
| 5,800,933 | A | 9/1998 | Hartig |
| 6,014,872 | A | 1/2000 | Hartig |
| 6,632,491 | B1 | 10/2003 | Thomsen |
| 8,101,278 | B2 | 1/2012 | Laird |
| 8,114,488 | B2 | 2/2012 | Alvarez |
| 8,124,237 | B2 | 2/2012 | Nunez-regueiro |
| 8,142,622 | B2 | 3/2012 | Ferreira |
| 8,173,263 | B2 | 5/2012 | Lingle |
| 8,221,833 | B2 | 7/2012 | Veerasamy |
| 8,580,355 | B2 | 11/2013 | Durandeau |
| 9,011,649 | B2 | 4/2015 | Kharchenko |
| 9,073,781 | B2 | 7/2015 | Nadaud |
| 9,469,565 | B2 | 10/2016 | Krasnov |
| 9,580,807 | B2 | 2/2017 | Bilaine |
| 9,656,346 | B2 | 5/2017 | Yeh |
| 9,919,959 | B2 | 3/2018 | Krasnov |
| 2008/0008829 | A1 | 1/2008 | Blacker |
| 2008/0264558 | A1 | 10/2008 | Hayes |
| 2009/0135319 | A1 | 5/2009 | Veerasamy |
| 2010/0071810 | A1 | 3/2010 | Nadaud |
| 2010/0215903 | A1 | 8/2010 | Tonar |
| 2010/0230543 | A1 | 9/2010 | Bruce |
| 2010/0266801 | A1 | 10/2010 | Jahoda |
| 2010/0295330 | A1 | 11/2010 | Ferreira |
| 2011/0273085 | A1 | 11/2011 | Garbar |
| 2011/0308693 | A1 | 12/2011 | Van Nutt |
| 2012/0087005 | A1 | 4/2012 | Reymond |
| 2012/0231228 | A1 | 9/2012 | Fujimori |
| 2013/0005139 | A1* | 1/2013 | Krasnov ............... G06F 3/045 438/652 |
| 2013/0122261 | A1 | 5/2013 | Barnes |
| 2013/0320241 | A1 | 12/2013 | Krasnov |
| 2013/0337200 | A1 | 12/2013 | Noethe |
| 2014/0059878 | A1 | 3/2014 | Bilaine |
| 2014/0106088 | A1 | 4/2014 | Bilaine |
| 2014/0363685 | A1 | 12/2014 | Okawa |
| 2015/0072084 | A1 | 3/2015 | Mimoun |
| 2016/0062691 | A1 | 3/2016 | Chang et al. |
| 2016/0168679 | A1 | 6/2016 | Nadaud |
| 2016/0368817 | A1 | 12/2016 | Krasnov et al. |
| 2017/0226631 | A1 | 8/2017 | Kappertz et al. |

FOREIGN PATENT DOCUMENTS

| | | |
|---|---|---|
| CN | 107162439 A | 9/2017 |
| EA | 200870318 A1 | 2/2009 |
| EP | 0272651 A3 | 8/1988 |
| EP | 2678132 A1 | 1/2014 |
| EP | 2268587 B1 | 7/2014 |
| EP | 2792650 A1 | 10/2014 |
| EP | 2792651 A1 | 10/2014 |
| EP | 2483214 B1 | 11/2014 |
| EP | 3003631 A1 | 4/2016 |
| EP | 2869963 B1 | 9/2016 |
| EP | 2839054 B1 | 6/2017 |
| EP | 2683669 B1 | 8/2017 |
| EP | 2118031 B2 | 4/2020 |
| JP | 2003012345 A | 1/2003 |
| JP | 2012037667 A | 2/2012 |
| JP | 2014531106 A | 11/2014 |
| JP | 2015529622 A | 10/2015 |
| KR | 20140116424 A | 10/2014 |
| RU | 2404142 C2 | 11/2010 |
| RU | 2406704 C2 | 12/2010 |
| RU | 2432329 C2 | 10/2011 |
| TW | 567343 B | 12/2003 |
| WO | 2006064059 A1 | 6/2006 |
| WO | 2006122900 A1 | 11/2006 |
| WO | 2007101964 A1 | 9/2007 |
| WO | 2007064450 A3 | 11/2007 |
| WO | 2008096089 A2 | 8/2008 |
| WO | 2009136110 A3 | 2/2010 |
| WO | 2010136788 A1 | 12/2010 |
| WO | 2010139908 A1 | 12/2010 |
| WO | 2010142926 A1 | 12/2010 |
| WO | 2011039488 A1 | 4/2011 |
| WO | 2011068111 A1 | 6/2011 |
| WO | 2012022874 A1 | 2/2012 |
| WO | 2012114038 A1 | 8/2012 |
| WO | 2012120238 A1 | 9/2012 |
| WO | 2013002983 A1 | 1/2013 |
| WO | 2013156721 A1 | 10/2013 |
| WO | 2014005755 A1 | 1/2014 |
| WO | 2014111664 A1 | 7/2014 |
| WO | 2014132000 A1 | 9/2014 |
| WO | 2014188127 A1 | 11/2014 |
| WO | 2015055932 A1 | 4/2015 |
| WO | 2015055944 A1 | 4/2015 |
| WO | 2015059388 A1 | 4/2015 |
| WO | 2015185848 A1 | 12/2015 |
| WO | 2016062691 A1 | 4/2016 |
| WO | 2017032947 A1 | 3/2017 |
| WO | 2018055310 A1 | 3/2018 |
| WO | 2018055311 A1 | 3/2018 |

OTHER PUBLICATIONS

International Search Report and Written Opinion for International Application No. PCT/IB2019/056575 dated Nov. 29, 2019, 12 Pages.

Notice of allowance received for KR application No. 10-2020-7036409, dated May 7, 2021, 5 pages.(2 Pages of English Translation and 3 Pages of Official notification).

Notice of Reasons for Refusal received for Japanese Application No. 2020-564198, dated Aug. 18, 2021, 9 pages (5 pages of English Translation and 4 pages of original document).

* cited by examiner

COATED ARTICLE INCLUDING ULTRA-FAST LASER TREATED SILVER-INCLUSIVE LAYER IN LOW-EMISSIVITY THIN FILM COATING, AND/OR METHOD OF MAKING THE SAME

CROSS-REFERENCE TO RELATED APPLICATION

This application is a division of U.S. application Ser. No. 16/052,166 filed on Aug. 1, 2018, the entire contents of which are hereby incorporated herein by reference.

TECHNICAL FIELD

Certain example embodiments of this invention relate to coated articles including substrates (e.g., glass substrates) supporting low-emissivity (low-E) coatings, and/or methods of making the same. More particularly, certain example embodiments of this invention relate to ultra-fast laser treatment of silver-inclusive low-E coatings, coated articles including such coatings, and/or associated methods.

BACKGROUND AND SUMMARY

Coated articles are known in the art. Coated articles have been used, for example, in window applications such as insulating glass (IG) window units, laminated products, vehicle windows, and/or the like.

In certain situations, designers of coated articles often strive for a combination of desirable visible transmission, desirable color values, high light-to-solar gain (LSG, which is equal to visible transmission ($T_{vis}$) divided by solar heat gain coefficient (SHGC)) values, low-emissivity (or low-emittance), low SHGC values, and low sheet resistance ($R_s$). High visible transmission, for example, may permit coated articles to be more desirable in certain window applications. Low-emissivity (low-E), low SHGC, high LSG, and low sheet resistance characteristics, for example, permit such coated articles to block significant amounts of infrared (IR) radiation from passing through the article. For example, by reflecting IR radiation, it is possible to reduce undesirable heating of vehicle or building interiors.

Low-E coatings in general involve one or more thin film layers comprising an infrared reflecting materials such as, for example, silver, sandwiched between dielectric layers. Single-, double-, triple-, and even quad-silver coatings have been disclosed. Low-E coatings are advantageous in commercial and residential window, skylight, and other applications, and have been incorporated into monolithic, laminated, IG unit, and other products. However, having coatings with very thin silver-based layers and low sheet resistance are in many ways conflicting requirements, demanding careful optimization of the growth and other process. As those skilled in the art will appreciate, performing such optimizations across multiple coater platforms for commercial applicability frequently will be considered nearly impossible. Therefore, it is desirable to find ways to post-process stacks containing thin silver-based films with a view to optimizing sheet resistance, emissivity, silver thickness, and deposition speed, etc.

Numerous attempts have been made to improve the quality of such coatings. For instance, attempts have been made to improve the quality of the silver-based or other IR reflecting layer, e.g., in order to promote LSG, SHGC, emissivity, and/or other values. And although current low-E coatings are useful for a wide variety of applications, it will be appreciated that it would be desirable to improve the quality of silver-based thin films deposited by sputtering, especially where such films are formed at high dynamic deposition rates. The nature of the deposition is such that films oftentimes have a large concentration of various structural defects (e.g., vacancies, Frenkel defects, dislocations, etc.). These defects may be surface defects and/or bulk in nature, and they sometimes may prevent thin films from displaying bulk behavior. In the energy landscape of the films, these defects may be trapped in deep energy wells.

In this regard, sputter deposition typically involves super-cooling of the deposited atoms, because the deposition temperature oftentimes is significantly less than the melting temperature. Sputter-deposited films in general contain much higher concentrations of vacancies than the thermal equilibrium values for a given deposition temperature. Heating can reduce the number of vacancies by allowing them to migrate to the film's surface, e.g., via grain boundaries, dislocations, etc.

Conventional heating involves timescales greater than milliseconds. Indeed, it is not uncommon for heat treatments to include timescales of 1-10 minutes or more. In such heating regimes, both electrons and phonons are heated simultaneously. Unfortunately, however, typical heating timescales are long enough for the heat to diffuse into the substrate or adjacent media, oftentimes more so than the actual metallic films. Temperature gradients are created and are much greater than the mean free path of heat carriers. Contaminant atoms can easily diffuse into the metallic system after recrystallization. And even though the kinetics is always near equilibrium, defects are not easily annealed at commonly used temperatures that, in any event, oftentimes are limited by the choice of substrate.

Certain example embodiments address these and/or other concerns. For instance, certain example embodiments of this invention relate to techniques for improving the quality of infrared reflecting layers in low-E and/or other coatings. That is, certain example embodiments reduce the number of defects and/or promote re-crystallization of silver-based layers in low-E and/or other coatings. This is accomplished in certain example embodiments through the use of ultra-fast melting, as enabled by picosecond and sub-picosecond (e.g., femtosecond) lasers. Certain example embodiments advantageously improve sheet resistance, emissivity, visible transmission, and the like.

In certain example embodiments, a method of making a coated article is provided. A low-emissivity (low-E) coating is formed on a substrate (e.g., borosilicate or soda lime silica glass), with the low-E coating comprising at least one sputter-deposited silver-based layer, and with each said silver-based layer being sandwiched between one or more dielectric layers. The low-E coating is exposed to laser pulses having a duration of no more than $10^{-12}$ seconds, a wavelength of 355-500 nm, and an energy density of more than 30 kW/cm$^2$. The exposing is performed so as to avoid increasing temperature of the low-E coating to more than 300 degrees C. while also reducing (a) grain boundaries with respect to, and vacancies in, each said silver-based layer, (b) each said silver-based layer's refractive index, and (c) emissivity of the low-E coating compared to its as-deposited form.

In different example embodiments, one, two, three, or more silver-based layers may be provided.

According to certain example embodiments, each said silver-based layer may be provided over and contacting a respective layer comprising a metal oxide such as zinc oxide (e.g., a layer comprising zinc tin oxide). Each layer comprising the metal oxide (e.g., each layer comprising zinc oxide or the like) may be substantially crystalline prior to the laser exposure.

According to certain example embodiments, normal emissivity of the low-E coating may improve at least 9%, compared to the low-E coating in its as-deposited state.

According to certain example embodiments, the laser exposure may be performed so as to promote at least some re-crystallization of each said silver-based layer.

According to certain example embodiments, the exposure exposing may be a-thermal with respect to at least silver-based layer(s).

In certain example embodiments, a method of making a coated article is provided. The method includes having a low-emissivity (low-E) coating on a glass substrate, with the low-E coating comprising at least one sputter-deposited silver-based layer, and with each said silver-based layer being sandwiched between one or more dielectric layers. The low-E coating is exposed to laser pulses having a duration of no more than $10^{-12}$ seconds and an energy density of at least 50 kW/cm$^2$, the exposing being performed so as to avoid increasing temperature of the low-E coating to more than 300 degrees C. while also (a) reducing vacancies in each said silver-based layer, (b) reducing each said silver-based layer's refractive index, (c) increasing visible transmission of the low-E coating, and (d) reducing emissivity of the low-E coating compared to its as-deposited form and to a level sufficient to decouple a relationship between emissivity and sheet resistance reductions for the low-E coating. Electrical conductivity (e.g., sheet resistance) also may be improved in certain example embodiments.

In certain example embodiments, a coated article is provided. The coated article includes a glass substrate; and a sputter-deposited low-emissivity (low-E) coating supported by the glass substrate, with the low-E coating including at least one silver-based layer provided over and contacting a layer comprising zinc oxide. The low-E coating is laser-treated with sub-picosecond laser pulses having an energy density of at least 50 kW/cm$^2$ so as to remove vacancies in the silver-based layer(s) and twin grain boundaries between the silver-based layer(s) and adjacent underlying layer(s) comprising zinc oxide. The low-E coating has a post-laser treatment emissivity that is improved and that is less than 0.02 (e.g., with each said silver-based layer is less than 25 nm, more preferably less than 20 nm).

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

Certain example embodiments of this invention relate to ultra-fast laser treatment of silver-inclusive low-E coatings, coated articles including such coatings, and/or associated methods. The ultra-fast laser modification of thin films involves laser pulses of picosecond or sub-picosecond (e.g., $10^{-12}$ seconds or lower, more preferably on the order of 1 s, 10 s, or 100 s of femtoseconds (and possibly lower)) durations, e.g., to improve the performance of the layer stack, particularly when such layer stacks include one or more silver-based layers. The laser modification is performed and likely causes at least some crystallization or re-crystallization of the silver in the silver-based layers. However, a perhaps more major driver of the silver-based layers' improvement relates to reorientation of grains and effects on grain boundaries. In this regard, the silver-based layers have an improved texture and are able to become denser and more bulk-like. In addition, the interface between the silver-based layer and at least the dielectric layer thereunder and/or the interface between the silver-based layer and the overlying layer, is/are improved. For instance, when a layer comprising silver is formed directly on and contacting a layer comprising zinc oxide (such as, for example, a layer comprising zinc tin oxide), the interface is improved, as the laser modification helps reduce the number of twin grain boundaries. The same or similar may be true with respect to the interface between, for example, a layer comprising silver that is formed under and directly contacting a layer comprising Ni, Cr, and/or Ti (e.g., a layer comprising NiCrOx). It is believed that the initiation of melting occurs at the upper and/or lower interfaces (e.g., the interface between the silver-based layer and a layer comprising NiCrOx and/or the interface between the silver-based layer and a layer comprising zinc oxide) at a temperature much lower than the melting point of bulk silver which, in turn, helps improve the interface roughness. Because the treated silver-based layer is more bulk-like with fewer defects (including fewer vacancies and grain boundaries therein) and there are fewer twin grain boundaries, the stack as a whole exhibits improved conductivity (and lower sheet resistance), emissivity (both hemispherical and normal), visible transmission, and infrared reflection. The refractive index and k-value drops for silver-based layer(s) in the layer stack, thereby improving optical performance of the coating. In addition, it is possible for such coatings to become more robust and/or resistant to corrosion, e.g., as a measurement of the stack after laser treatment indicated overall compressive (rather than tensile) stress.

In conventional coatings, there is a relationship between sheet resistance and emissivity. In general, they are directly correlated, such that a reduction in sheet resistance is accompanied by an expected corresponding reduction in emissivity. However, certain example embodiments use a femtolaser or the like, which ultimately affects the mobility of electrons after treatment. Certain example embodiments are able to reduce emissivity in this way to a level below 0.02 (and sometimes below 0.015), where there is a decoupling of this relationship. Therefore, the laser treatment of certain example embodiments is able to decrease conductivity but also reduce normal and hemispherical emissivity in a way that does not correspond with expected changes.

Surprisingly and unexpectedly, the layer stack can be improved without a significant amount of crystallization (or re-crystallization) of the silver. This is contrary to the principle upon which heat treatment typically works, and contrary to the re-melting/ablation that oftentimes occurs when lasers are used with metals. In certain example embodiments, the ultra-fast laser treatment delivers energy through laser pulses. Any "heating" in this technique occurs at a timescale such that atoms cannot diffuse into coating. Instead, the laser treatment simply excites electrons, which have a small heat capacity because they have virtually no mass. Thus, gross physical temperature measurements are not that high. Data collected using a thermocouple and thermal imager revealed that there was no appreciable rise in the temperature of the coating on samples, which is contrary to what would have been expected in conventional thermal heat treatment as well as many other kinds of laser treatments. For example, continuous (CW) laser treatment does not have this property. Moreover, although an improvement in sheet resistance can take place when a CW laser is used, it is possible to observe burnish marks in silver-based layers. In certain example embodiments, it is possible to conduct ultra-fast laser modification of the stack and avoid causing the temperature of the stack to exceed 300 degrees C. (e.g., as measured by its surface temperature). In certain example embodiments, the ultra-fast laser modification of the stack is "a-thermal" with respect to at least the silver-based layer(s) therein. In some instances, the technique may be a-thermal with respect to the stack as a whole. Thus, in certain example embodiments, the temperature of the stack increases to no more than 300 degrees C. and preferably increases by no more than 50 degrees C., more preferably by no more than 30 degrees C., and sometimes by no more than 5-10 degrees C. Certain example embodiments therefore are able to achieve superior conductivity and emissivity levels, surprisingly and unexpectedly, without large temperature rises and without requiring significant crystallization (or re-crystallization). Certain example embodiments do not involve ablation, although some burnishing may be visible in some instances.

Without wishing to be bound by theory, a possible explanation of certain mechanisms by which certain example embodiments may operate will now be provided. When ultra-fast laser exposure is used, there is a thermal spike caused by electrons being "heated" to temperatures that are multiples of 10,000 K. When the laser is shown on the coating, this thermal spike creates homogeneous melting with respect to the silver-based layer(s) in the first few picoseconds. In more detail, the laser pulses excite conduction electrons (e.g., in connection with a high density electron "gas"), and bound electrons also are excited. This hot electron gas interacts with the ionic lattice (e.g., in connection with a phonon cloud). The phonon cloud includes both acoustic and optical branches, and the optical phonons advantageously are localized. The laser pulses therefore are able to change the (nano-)crystalline and/or other silver to liquid in about 1 picosecond. The melt front propagates beyond the absorption depth, and the temperature gradient created is smaller than mean free path.

The ultra-fast heating can deliver the energy density per area needed (e.g., 0.1 to 0.5 J/cm$^2$) to excite a high density of electrons, leading to rapid heating and subsequent cooling. The production of a high vacancy concentration (nc) has a significant effect of phase transformation. Some secondary re-crystallization can proceed in the presence of the high nc but, perhaps more significantly, grain-boundary migration is accelerated, and larger grains are formed or re-formed, as the bulk quality of the silver is improved. Advantageously, this approach does not lead to observable temperature increases in the coating and, as discussed above, the approach is a-thermal with respect to at least the silver. As a result, there is very little surface energy and strain energy added to the system. It is believed that a power density of at least about 30 kW/cm$^2$ is needed to enable certain example embodiments, e.g., with the durations described herein.

Figure 1:
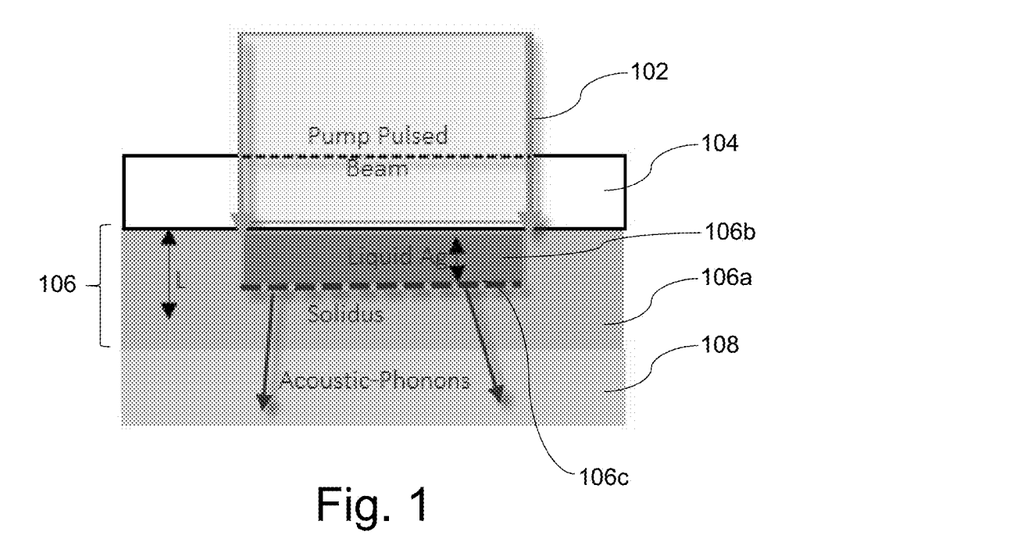
FIG. 1 is a schematic view demonstrating the melting process of certain example embodiments.

FIG. 1 is a schematic view demonstrating the melting process of certain example embodiments. As shown in FIG. 1, the pulsed beam 102 extends through the top insulator 104 to an extinction length L (equivalent to the wavelength of the laser in certain example embodiments) and into the silver-based layer 106. The extinction length L preferably does not extend into the bottom insulator 108. As will be appreciated from the example stacks discussed in greater detail below, the bottom insulator 108 may be a layer comprising zinc oxide (e.g., a layer comprising zinc tin oxide), and the top insulator 104 may be a layer comprising Ni, Cr, and/or Ti (e.g., a layer comprising NiCrOx). In certain example embodiments, the bottom insulator 108 may be crystalline prior to laser beam treatment.

In the width of the pulsed beam 102, the solidus portion 106a is liquefied creating a liquid portion 106b. The melt front 106c gradually extends through the depth of the silver-based layer 106 (e.g., upon subsequent scans, through changes to the extinction length L, etc.). Advantageously, the onset of melting takes place at temperatures much lower than melting point of bulk silver. Acoustic-phonons are coupled into the bottom insulator 108. As noted above, the process is in essence a-thermal, as the excitation is very quick and the electrons convey a large amount of energy with very little mass. As also will be appreciated, there is no intentional thermal heating of the silver-based layer or any other layer in the stack in this process, and there is no absorber layer provided.

Advantageously, the laser pulse duration is less than the coupling time of e-phonons. If this were not the case, the laser would couple into a plasma instead of causing electron excitation inside of the metal film. Consequently, certain example embodiments employ laser thin-film treatment in a pulsed regime at very short times. This provides lower energy loss and lower risk of substrate damage.

Ultra-thin film silver-based layers melt under the ultra-fast laser pulse well below the 970 degrees C. for silver, as noted above. In thick films (e.g., bulk systems), the surface-to-volume ratio is extremely small and the curvature of the surface is negligible. Thus, surface effects on the melting temperature can be disregarded. However, for the case of a nano-metric thin film comprising Ag and composed of nano-sized grains (e.g., 3-5 nm), for which the surface-to-volume ratio is large and the surface curvature is high, the melting temperature is size dependent. This behavior has been partly explained by thermodynamics theory and shown experimentally by electron diffraction, X-ray diffraction, differential scanning calorimetry, and transmission electron microscopy. However, an additional effect under the kinetics of the fast laser pulse interaction with the interface of the Ag and dielectric involves a significant drop in the melting temperature of the nano-thick silver film to as low as 125 degrees C. Because the pressure within the film is much higher than the vapor pressure of Ag, the films would not be expected to vaporize. Instead, the initial onset of melting is followed by a fast quenching and annealing of defects at the interface. In general:

$$T_{m,f}=T_0(1-\sigma_{SL}/(L_0<r>))$$

where Tm is the melting point of a film with grain size (e.g., radius) r, $T_0$ is the bulk melting temperature of the silver film, $\sigma_{SL}$ is the solid-liquid interfacial energy, and $L_0$ is the bulk latent heat of fusion. There are, however, significant differences between what is predicted from this equation and the experimentally derived value of Tm,f, even if the vacuum pressure in the thin film stack environment is considered. One possible reason for this might be a change in the solid-liquid interfacial energy due to curvature effects or non-equilibrium effects. In fact, the laser light couples to the Ag/insulator film interface via surface plasmon excitations, whereby collective electron oscillations facilitate the efficient absorbing of the laser photons.

The following laser parameters may be used in connection with certain example embodiments:

Laser Mode: Pulsed, with widths no greater than picoseconds, more preferably on the order of 1 s, 10 s, or 100 s of femtoseconds (but possibly lower). In certain example embodiments, pulsed mode durations may be no more than $10^{-12}$ seconds, more preferably on the order of 1 s, 10 s, or 100 s of femtoseconds. A duration of less than a few picoseconds (e.g., less than 9 picoseconds, more preferably less than 5 picoseconds, and still more preferably less than or equal to 1-3 picoseconds) is preferable. One example duration is 100-500 femtoseconds (more preferably 100-300 femtoseconds and, for example, 100 or 200 femtoseconds). At durations below 1 femtosecond, the power density generally will be too low to achieve the results described herein, e.g., as the apparent threshold of about 30 kW/cm$^2$ will not be met.

Laser Type: Excimer Laser (e.g., operating in chirp mode). Ti-Sapphire in tandem to SHG (second harmonic generation) lasers also may be used in some instances.

Power Density: At least about 30 kW/cm$^2$, more preferably at least about 50 kW/cm$^2$. The power density preferably is selected so as to avoid damage or scarring with respect to the film. At 50 kW/cm$^2$, crystallization greater than 50% was achieved.

Wavelength: In general, a wavelength of 355-500 nm may be used. Samples were produced with a 355 nm wavelength excimer laser. Samples also were produced using a 400 nm SHG laser. A 405 nm GaN laser may be used in some instances.

Beam Profile: Homogeneous Flat Top (HFT). The HFT beam profile (as compared to, for example, a Gaussian beam profile) advantageously did not leave surface micro-scars, and an improvement to corrosion resistance was observed.

Beam Size: Preferably <500 microns, with sharper beams being possible in certain example embodiments.

Absorption Mechanism Promoted: Interfacial and bulk Ag plasmon mediated (as compared to, for example, using a thermal profile aided by having a separate absorber layer in the stack). This approach advantageously works well on single, double, and triple silver layer stacks. Certain example embodiments advantageously lack a separate absorption layer and instead are a-thermal as described above.

Beam Optics: Potentially galvo-based, involving an extremely high scan rate of a moving target. A Shafter-Kirchoof Line Generator may be used in some implementations.

Fluence Range: 0.5 to 5 J/cm$^2$, more preferably 0.5 to 3 J/cm$^2$, and possibly from a minimum of 0.1-0.6 J/cm$^2$ Repetition Rate: 1-100 KHz Shot-to-Shot Stability: 0.5-1% rms Long-term Drift: 0.1-0.5% rms Laser Treatment Environment: The laser treatment may take place in ambient air, in a nitrogen environment, under full or partial vacuum, etc.

Based on the experimental data obtained thus far, it is believed that the techniques described herein can be used to improve some or all of sheet resistance, emissivity (both normal and hemispherical), transmission, and refractive index (or refractive indices in the case layer stacks including multiple silver-inclusive layers). For example, it is believed that sheet resistance can be improved (e.g., lowered) by at least 9%, more preferably at least 11%, more preferably at least 15%, and possibly 15-20% or higher; normal and hemispherical emissivity can be improved (e.g., lowered) by at least 9%, more preferably at least 11%, more preferably at least 15%, and possibly 15-20% or higher; normal emissivity can reach a level preferably less than 0.02, more preferably less than 0.015; refractive index (or refractive indices) of the silver-based layer(s) at 550 nm can be improved (e.g., lowered) by at least 10%, more preferably at least 15%, and possibly 20-25% or more; and visible transmission (TY) can be improved (e.g., increased) by at least 0.25%, more preferably at least 0.5%, and possibly 0.75-1.5% or greater. In some instances, a visible transmission increase as low as possible might be desirable and might be achievable in some instances. In general, by varying several parameters such as, for example, wavelength, pulse duration, duty cycle, and energy density, as well as initial film crystallite size and seed layer, one can tune the time constant tau and resistivity, which in turn encode the fundamental properties of the silver thin and thick films. As one example, an energy density per area in the range of 0.5 to 5 J/cm$^2$, more preferably 0.5 to 2 J/cm$^2$ for a pulse of 100-200 femtoseconds with a wavelength of 450 nm can be used.

Sample Set 1

Figure 2:
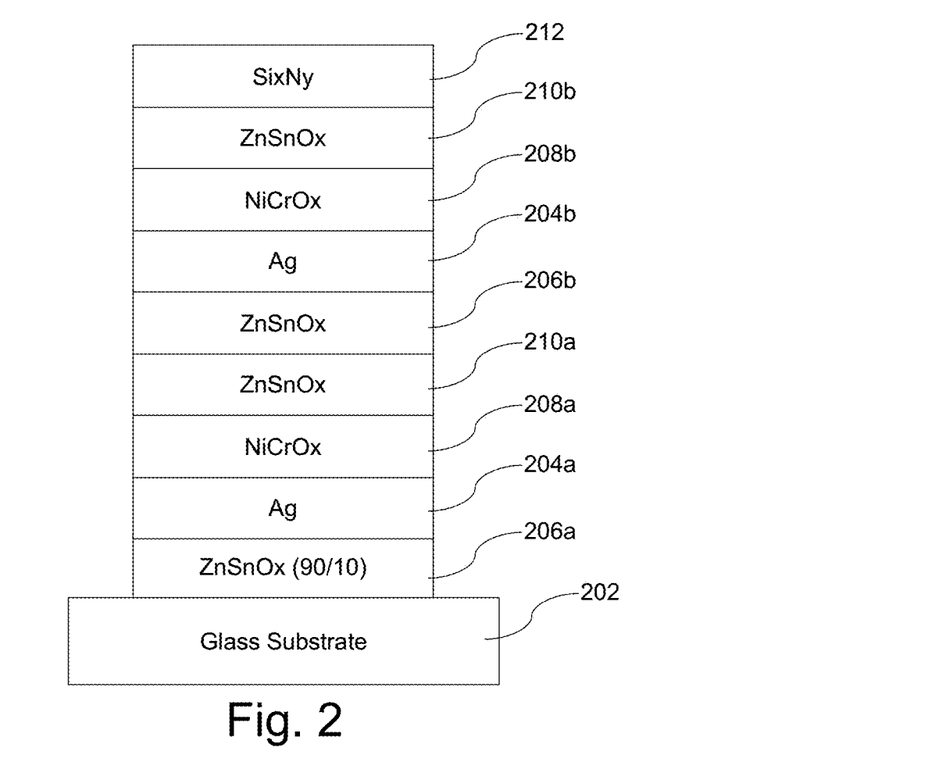
FIG. 2 is an example double-silver low-E coating that was used in connection with a first set of samples.

FIG. 2 is an example double-silver low-E coating that was used in connection with a first set of samples. The coating shown in FIG. 2 was formed on 3.2 mm thick clear glass and on 0.7 mm thick Eagle glass, both of which substrate materials are commercially available. As is known, the former is a soda lime silica based glass, whereas the latter is a borosilicate glass. Nominal physical thicknesses for the coating used in this sample set were specified as follows:

| Material/Layer | Preferred Thickness (nm) | More Preferred Thickness (nm) | Sample Thickness (nm) |
|---|---|---|---|
| Si$_3$N$_4$ [212] | 15-30 | 17-25 | 22.0 |
| ZnSnOx (50/50) [210b] | 5-18 | 7-15 | 10.5 |
| NiCrOx [208b] | 1-10 | 2-8 | 3.5 |
| Ag [204b] | 5-18 | 7-16 | 13.6 |
| ZnSnOx (90/10) [206b] | 15-25 | 18-23 | 19.9 |
| ZnSnOx (50/50) [210a] | 50-90 | 55-80 | 69.00 |
| NiCrOx [208a] | 1-10 | 2-8 | 3.5 |

-continued

| Material/Layer | Preferred Thickness (nm) | More Preferred Thickness (nm) | Sample Thickness (nm) |
|---|---|---|---|
| Ag [204a] | 2-12 | 4-10 | 7.5 |
| ZnSnOx (90/10) [206a] | 30-50 | 35-45 | 39.4 |
| GLASS [202] | N/A | N/A | N/A |

Figure 3A:
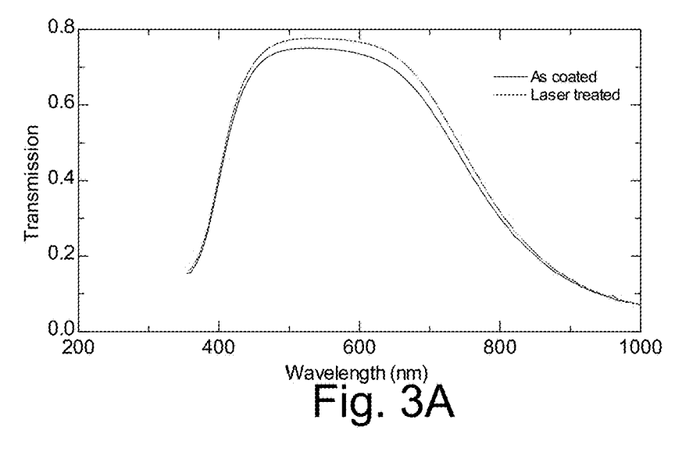
FIGS. 3A-3B are graphs plotting transmission vs. wavelength before and after laser treatment, for the clear and Eagle glass samples described in connection with FIG. 2.
Figure 3B:
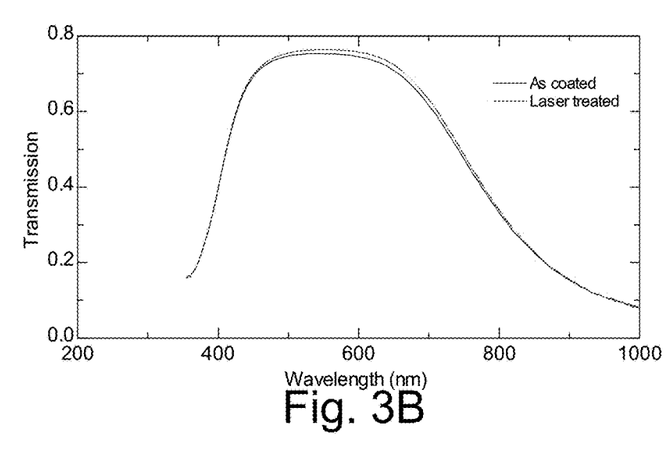
Figure 4A:
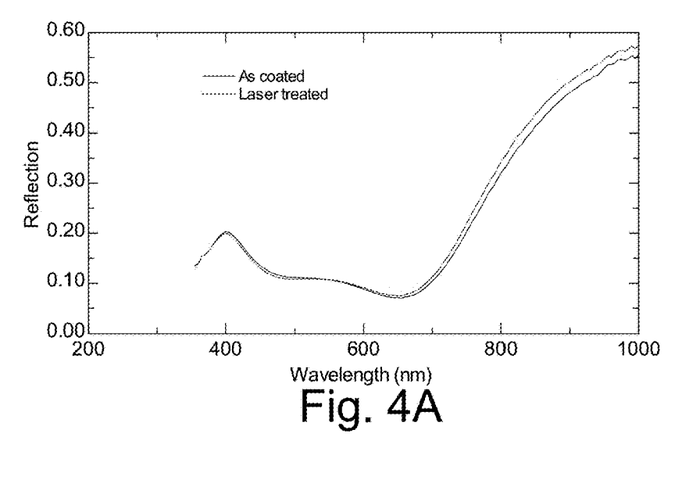
FIGS. 4A-4B are graphs plotting glass-side reflection vs. wavelength before and after laser treatment, for the clear and Eagle glass samples described in connection with FIG. 2.
Figure 4B:
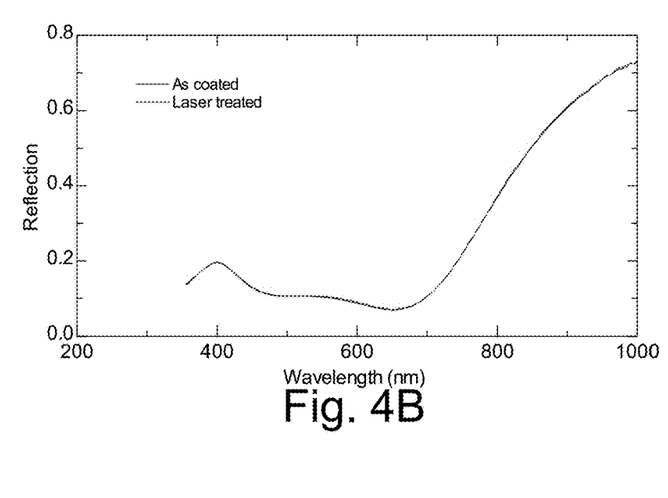
Figure 5A:
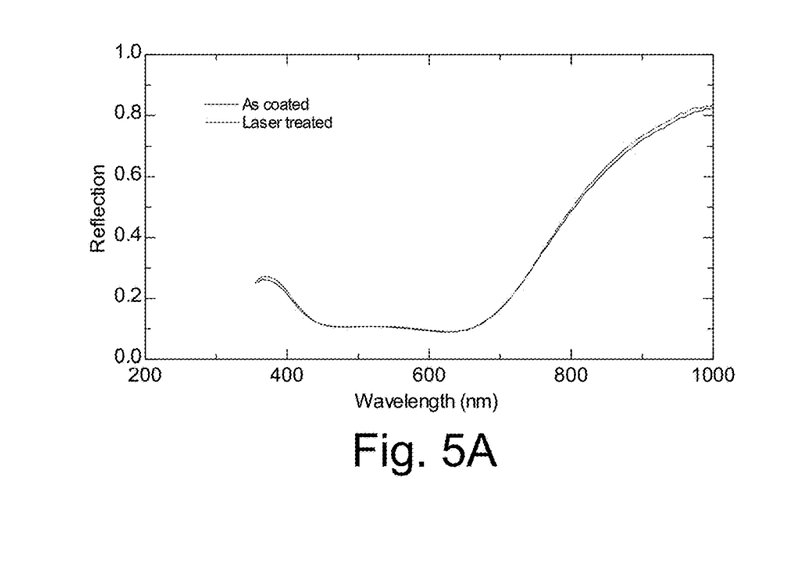
FIGS. 5A-5B are graphs plotting film-side reflection vs. wavelength before and after laser treatment, for the clear and Eagle glass samples described in connection with FIG. 2.
Figure 5B:
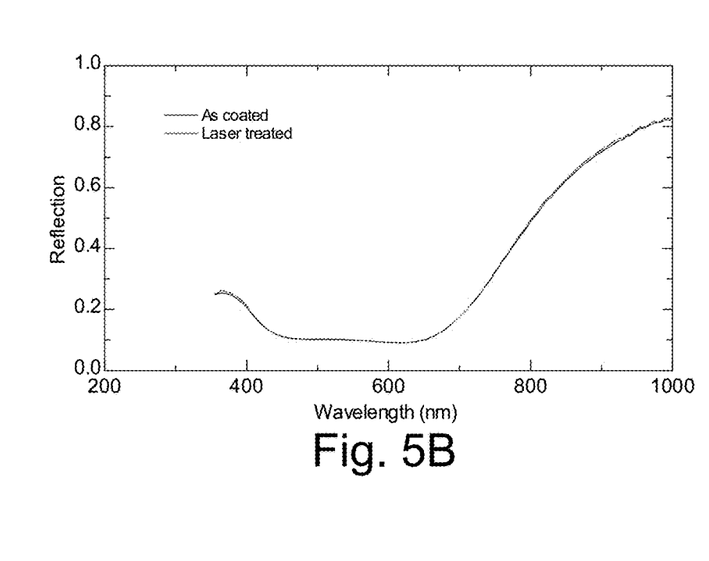

It is noted that the laser irradiated area was more noticeable on the clear glass compared to the Eagle glass. FIGS. 3A-3B are graphs plotting transmission vs. wavelength before and after laser treatment, for these clear and Eagle glass samples, respectively; FIGS. 4A-4B are graphs plotting glass-side reflection vs. wavelength before and after laser treatment, for these clear and Eagle glass samples, respectively; and FIGS. 5A-5B are graphs plotting film-side reflection vs. wavelength before and after laser treatment, for these clear and Eagle glass samples, respectively. The following table summarizes this transmission, reflection, and color change information for the samples, and provides sheet resistance information as well:

|  | Clear Glass | | Eagle Glass | |
|---|---|---|---|---|
| State | As-Coated | Laser Treated | As-Coated | Laser Treated |
| Sheet resistance | 2.15 | 1.9 | 2.22 | 2.13 |
| Haze | 0.19 | 0.12 | 0.21 | 0.18 |
| Y [T] | 74.11 | 76.92 | 74.63 | 75.72 |
| L* [T] | 88.98 | 90.28 | 89.22 | 89.73 |
| a* [T] | −4.4 | −4.14 | −3.87 | −3.8 |
| b* [T] | 4.9 | 5.39 | 5.2 | 5.58 |
| Y [Rf] | 10.2 | 10.33 | 9.81 | 9.72 |
| L* [Rf] | 38.2 | 38.44 | 37.51 | 37.34 |
| a* [Rf] | 0.04 | 0.12 | 1.45 | 1.61 |
| b* [Rf] | −5.06 | −4.64 | −5.1 | −5.14 |
| Y [Rg] | 10.16 | 10.2 | 9.85 | 10.02 |
| L* [Rg] | 38.13 | 38.19 | 37.58 | 37.88 |
| a* [Rg] | −0.55 | −0.23 | −0.19 | −0.21 |
| b* [Rg] | −9.81 | −8.44 | −9.33 | −8.35 |
| ΔE* [T] |  | 1.41 |  | 0.64 |
| ΔE* [Rf] |  | 0.57 |  | 0.4 |
| ΔE* [Rg] |  | 0.56 |  | 0.43 |

It can be seen that transmission increased and sheet resistance decreased. Transmissive coloration also remained largely constant, with the a and b color coordinates changing only moderately with respect to film- and glass-side reflection.

The following table summarizes texture change information for the samples, gathered by x-ray diffraction (XRD) measurement. The texture change on Eagle glass (after laser treatment) was an increase in 45%, and the texture change on clear glass (after laser treatment) was an increase of 57%. Compared to the as-coated state of silver on clear glass, the as-coated state of silver on Eagle glass presents a relatively poorer texture, which could help explain why the texture change was not as great for the coating on Eagle glass compared to the coating on clear glass.

|  | Ag(111) Max. counts | Ag(111) Angle at max. | Ag(111) FHWM | Ag(111) Particle size [nm] | ZnO(002) Max. counts |
|---|---|---|---|---|---|
| Eagle Glass Laser Treated | 801 | 38.26 | 0.727 | 13.9 | 228 |
| Eagle Glass As-Coated | 554 | 38.16 | 0.784 | 12.9 | 240 |
| Clear Glass Laser Treated | 2603 | 38.28 | 0.766 | 13.2 | 996 |
| Clear Glass As-Coated | 1658 | 38.18 | 0.844 | 12 | 1052 |

The samples were measured to determine the indices of refraction (at 550 nm) for the upper and lower silver-based layers before and after laser treatment. The as-coated (before) indices of refraction of the upper and lower silver-based layers for the clear glass samples were 0.11 and 0.16 respectively, and these values decreased to 0.08 and 0.10 respectively following laser treatment. Surface roughness prior to laser treatment was 5.84 nm and this value increased to 5.94 nm after laser treatment.

The as-coated (before) indices of refraction of the upper and lower silver-based layers for the Eagles glass samples were 0.14 and 0.20 respectively, and these values decreased to 0.11 and 0.19 respectively following laser treatment. Surface roughness prior to laser treatment was 5.70 nm and this value decreased to 5.67 nm after laser treatment.

In both the clear and Eagle glass samples, the layer thicknesses stayed substantially the same after laser treatment. That is, no layer exhibited a thickness change of more than 0.4 nm, and most layers exhibited a thickness change of more than 0.3 nm.

Given this data, it is surmised that the top silver will be improved more than the lower silver in a double-silver low-E coating. It also is surmised that in a triple-silver low-E coating, the changes to the uppermost silver will change the most in comparison to the underlying silver layers and it therefore will contribute the most to the change in emissivity for the overall coating.

Sample Set 2

Figure 6:
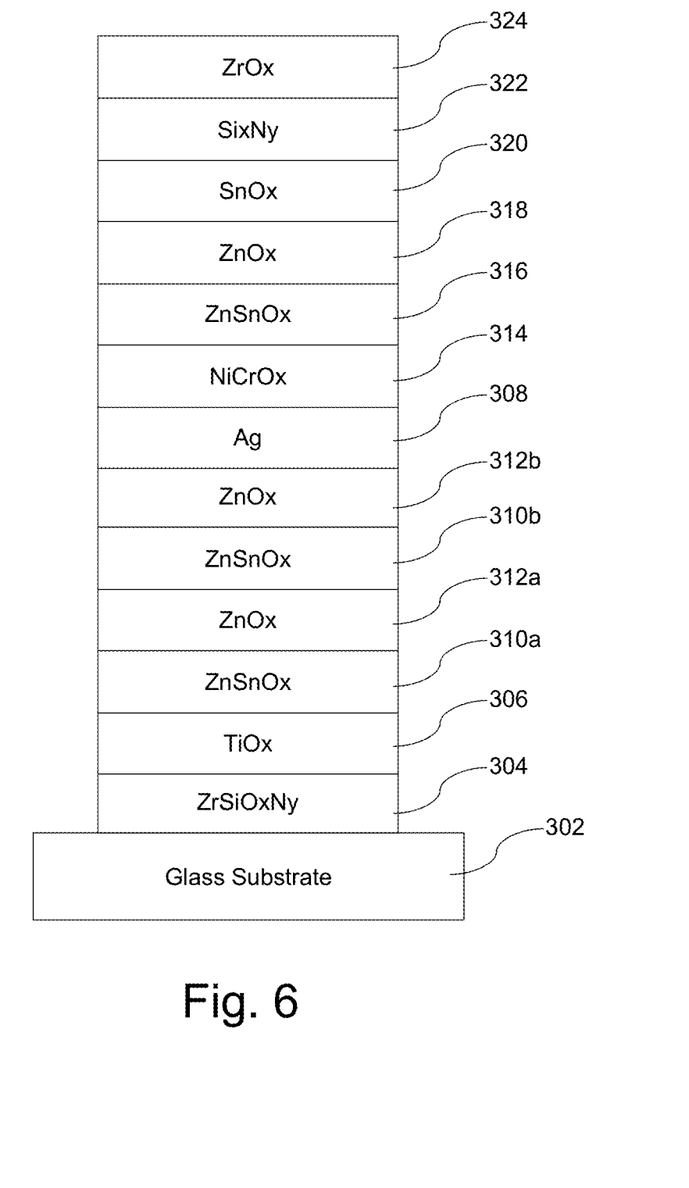
FIG. 6 is an example of a single-silver low-E coating that was used in connection with a second set of samples.

FIG. 6 is an example single-silver low-E coating that was used in connection with a first set of samples. The coating shown in FIG. 6 was formed on 3.8 mm thick clear glass. Nominal physical thicknesses for the coating used in this sample set were specified as follows:

| Material/Layer | Preferred Thickness (nm) | More Preferred Thickness (nm) | Sample Thickness (nm) |
|---|---|---|---|
| ZrOx [324] | 1-15 | 3-10 | 3 |
| Si$_3$N$_4$ [322] | 3-25 | 5-15 | 11.1 |
| SnOx [320] | 2-10 | 3-8 | 5.5 |
| ZnOx [318] | 10-25 | 12-22 | 17 |
| ZnSnOx [316] | 2-12 | 4-10 | 6.6 |
| NiCrOx [314] | 1-10 | 2-8 | 3 |
| Ag [308] | 2-15 | 4-13 | 8.7 |
| ZnOx [312b] | 8-20 | 10-16 | 12.3 |
| ZnSnOx [310b] | 2-10 | 3-7 | 4.1 |
| ZnOx [312a] | 2-10 | 3-8 | 4.8 |
| ZnSnOx [310a] | 2-10 | 3-8 | 5.3 |
| TiOx [306] | 1-10 | 2-8 | 3 |
| ZrSiOxN$y$ [304] | 3-15 | 5-12 | 7.4 |
| GLASS [302] | N/A | N/A | N/A |

Measurements were taken for 5 different samples, plus the original as-coated sample. The first four samples used a laser power of 135 mW, and the fifth sample used a laser power of 130 mW. The overlap or line spacing for samples 1-2 and 5 was 0.03 mm, the overlap or line spacing for sample 3 was 0.02 mm, and the overlap or line spacing for sample 4 was 0.01 mm. The laser scanning speed for sample 2 was 3 mm/s and was 5 mm/s for all other samples.

Figure 7:
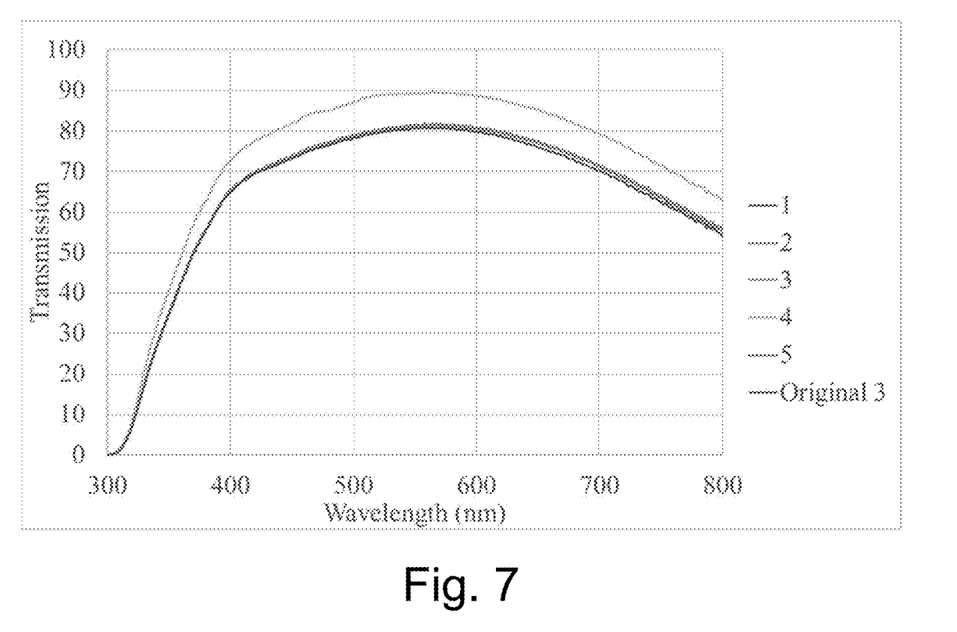
FIG. 7 is a graph plotting transmission vs. wavelength for the five samples in the second sample set, along with the transmission curve for the original as-coated sample.
Figure 8:
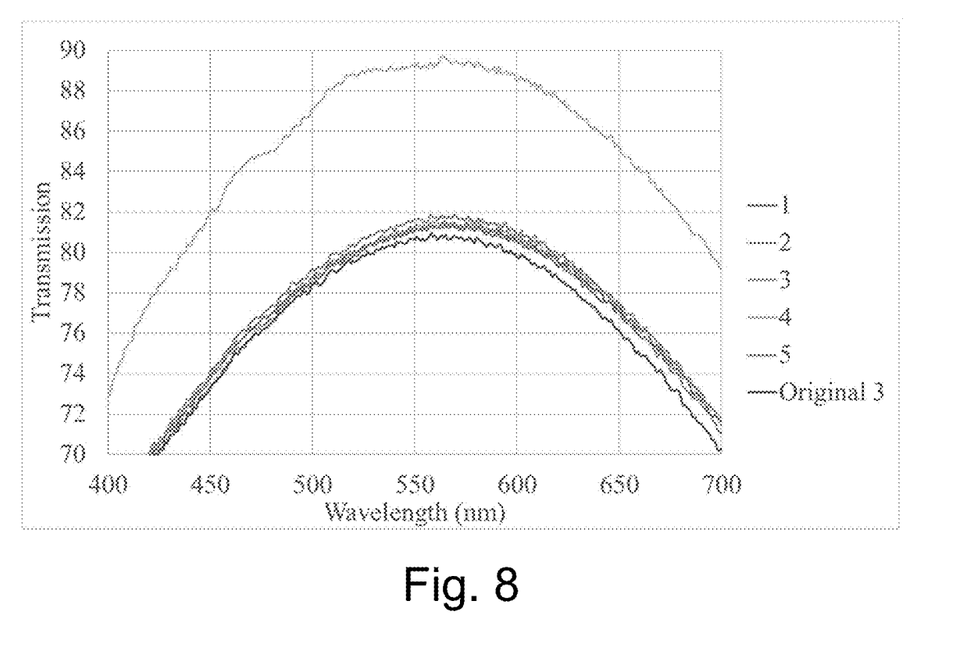
FIG. 8 is an enlargement of a portion of the FIG. 7 graph.

FIG. 7 is a graph plotting transmission vs. wavelength for the five samples in the second sample set, along with the transmission curve for the original as-coated sample. FIG. 8 is an enlargement of a portion of the FIG. 7 graph. A transmission improvement was achieved by increasing the overlap (reducing the offset along the slow scan axis) most notably with the fourth sample. It was confirmed that samples 4-5 were free from microscopic damage related to the laser treatment.

Sample Set 3

Several additional sample coated articles with single-silver low-E coatings were treated with a common set of parameters. These parameters included 150 mW power, a scan speed of 5 mm/s, with an overlap or line spacing of 0.035 mm. the laser operated at a wavelength of 532 nm with a repetition pulse rate of 100 KHz and a beam diameter of 1 mm. In general, processing power of 0.1-5.0 W and 0.04-0.025 mm overlap or line spacing were considered for the trials and are believed to be viable for different example embodiments.

Figure 9:
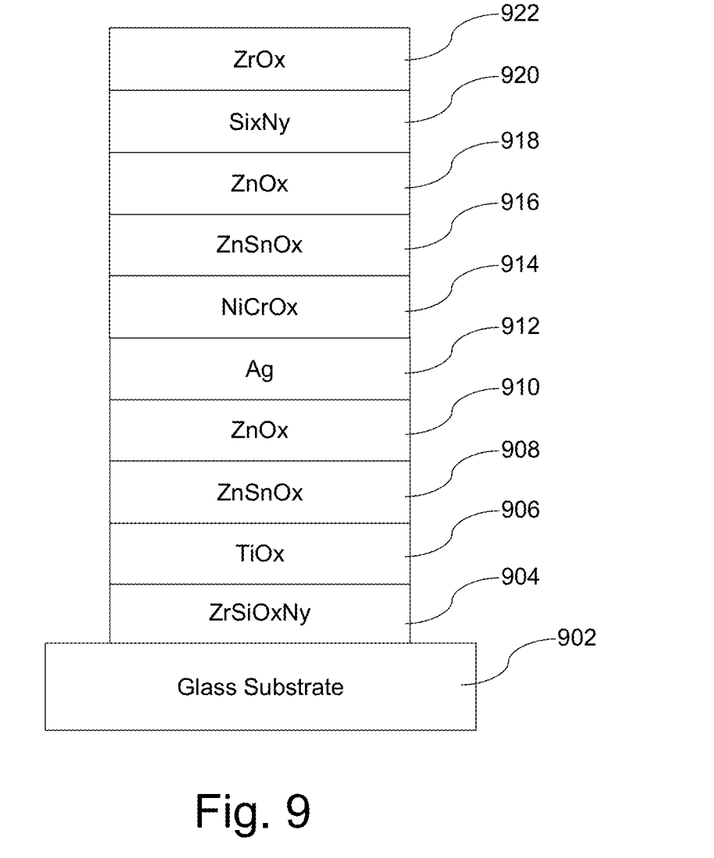
FIG. 9 is an example single-silver low-E coating that was used in connection with a third set of samples.

The layer stacks that were heat treated included one sample matching that shown in FIG. 6 and with the sample layer thickness provided above, as well as two layer stacks having the configuration shown in FIG. 9. The coating shown in FIG. 9 was formed on 3.8 mm thick clear glass. Nominal physical thicknesses for the coating used in these two samples set were specified as follows:

| Material/Layer | Preferred Thickness (nm) | More Preferred Thickness (nm) | Sample Thickness (nm) |
| --- | --- | --- | --- |
| ZrOx [922] | 1-15 | 3-10 | 3.3 |
| $Si_3N_4$ [920] | 1-30 | 10-25 | 18.9 and 14.6 |
| ZnOx [918] | 10-25 | 12-23 | 17.9 |
| ZnSnOx [916] | 2-12 | 4-10 | 6.4 |
| NiCrOx [914] | 1-10 | 2-8 | 3 |
| Ag [912] | 5-30 | 8-25 | 19.6 and 11.5 |
| ZnOx [910] | 3-15 | 5-13 | 7.3 and 8.8 |
| ZnSnOx [908] | 1-10 | 2-5 | 2.2 and 3.1 |
| TiOx [906] | 1-10 | 3-9 | 3.6 |
| ZrSiOxNy [904] | 3-15 | 5-12 | 7.4 |
| GLASS [902] | N/A | N/A | N/A |

The following table provides data indicating how these coatings were improved following the laser treatment.

| | SR Improvement | En Improvement | TY Gain |
| --- | --- | --- | --- |
| FIG. 6 sample | 10.6% | 12.7% | 0.41% |
| FIG. 9 sample (thinner silver) | 13.7% | 9.3% | 0.88% |
| FIG. 9 sample (thicker silver) | 21.2% | 15.8% | 1.19% |

The example embodiments described herein may be incorporated into a wide variety of applications including, for example, interior and exterior windows for commercial and/or residential application, skylights, doors, merchandizers such as refrigerators/freezers (e.g., for the doors and/or "walls" thereof), vehicle applications, etc.

The techniques described herein have been discussed in connection with certain example low-E coatings. It is noted, however, that different low-E coatings may benefit from the ultra-fast laser treatments discussed herein. Such low-E coatings may have one, two, three, or more Ag-based layers, they may or may not have underlayers comprising ZnOx, ZnSnOx, etc., they may or may not have silver-based layer overcoats comprising Ni, Cr, Ti, and/or the like (e.g., NiCrOx), etc. For example, although a layer comprising zinc oxide (e.g., zinc tin oxide) may be used directly under and in contact with the silver-based layer(s), it will be appreciated that other metal oxide inclusive and/or other layers may be used in different example embodiments. These metal oxide inclusive and/or other layers may be substantially crystalline prior to the laser exposing in certain example embodiments.

Although certain example embodiments have been described in connection with coated articles including a single glass substrate supporting a coating, it will be appreciated that the techniques described herein may be applicable in connection with IG units including two substantially parallel spaced apart substrates separated by a spacer system helping to define an air gap therebetween. Low-E coatings may be provided to any one or more of the major surfaces thereof (e.g., surfaces 2 and/or 3). That air gap may be filled with an inert gas such as Ar, Kr, Xe, or the like, with or without oxygen. It also will be appreciated that the techniques described herein may be applied with respect to so-called triple-IG units. In such units, first, second, and third substantially parallel spaced apart substrates are separated by first and second spacer systems, and low-E and/or antireflection (AR) coatings may be provided adjacent to any one or more of the interior surfaces of the innermost and outermost substrates, and/or to one or both of the surfaces of the middle substrate. Low-E coatings may be provided to any one or more of the major surfaces (and typically interior major surfaces). Similarly, the techniques described herein may be used in connection with vacuum insulating glass (VIG) units, where first and second substantially parallel spaced apart substrates are maintained in this configuration in connection with a plurality of spacers or pillars and a peripheral edge seal. The peripheral edge seal in such cases typically is formed of a frit material and hermetically seals the gap or cavity of the VIG unit. The gap or cavity is maintained at a pressure less than atmospheric. As above with the IG unit example, low-E coatings may be provided to any one or more of the major surfaces thereof (e.g., surfaces 2 and/or 3). Furthermore, laminated articles also may benefit from the techniques disclosed herein.

It is noted that the laser treatment may be performed from a coated side or a non-coated side of a supporting substrate. Thus, laser treatment may be performed on an IG unit, VIG unit, or laminated product once assembled, and/or a subassembly of the same (e.g., before substrates of the IG unit are fixed together with the spacer system, before substrates of the IG unit are sealed together with the frit and/or before pump-down of the cavity, before the substrate is laminated something else, etc.).

The terms "heat treatment" and "heat treating" as used herein mean heating the article to a temperature sufficient to achieve thermal tempering and/or heat strengthening of the glass inclusive article. This definition includes, for example, heating a coated article in an oven or furnace at a temperature of at least about 550 degrees C., more preferably at least about 580 degrees C., more preferably at least about 600 degrees C., more preferably at least about 620 degrees C., and most preferably at least about 650 degrees C. for a sufficient period to allow tempering and/or heat strengthening. This may be for at least about two minutes, or up to about 10 minutes, in certain example embodiments. These processes may be adapted to involve different times and/or temperatures.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

In certain example embodiments, a method of making a coated article is provided. A low-emissivity (low-E) coating is formed on a substrate, with the low-E coating comprising at least one sputter-deposited silver-based layer, and with each said silver-based layer being sandwiched between one or more dielectric layers. The low-E coating is exposed to laser pulses having a duration of no more than 10-12 seconds, a wavelength of 355-500 nm, and an energy density of more than 30 kW/cm2, the exposing being performed so as to avoid increasing temperature of the low-E coating to more than 300 degrees C. while also reducing (a) grain boundaries with respect to, and vacancies in, each said silver-based layer, (b) each said silver-based layer's refractive index, and (c) emissivity of the low-E coating compared to its as-deposited form.

In addition to the features of the previous paragraph, in certain example embodiments, the substrate may be borosilicate glass or soda lime silica glass.

In addition to the features of either of the two previous paragraphs, in certain example embodiments, each said silver-based layer may be provided over and contacting a respective layer comprising zinc oxide.

In addition to the features of the previous paragraph, in certain example embodiments, each said layer comprising zinc oxide may be substantially crystalline prior to the exposing.

In addition to the features of any of the four previous paragraphs, in certain example embodiments, the low-E coating may comprise first and second silver-based layers.

In addition to the features of any of the five previous paragraphs, in certain example embodiments, the low-E coating may comprise at least three silver-based layers.

In addition to the features of any of the six previous paragraphs, in certain example embodiments, the low-E coating may comprise a plurality of silver-based layers and the exposing may practiced so as to alter the uppermost silver-based layer's texture more than that of the underlying silver-based layer(s).

In addition to the features of any of the seven previous paragraphs, in certain example embodiments, the laser pulses may have an energy density of at least 50 kW/cm2 and/or a duration on the order of 1 s, 10 s, or 100 s of femtoseconds.

In addition to the features of any of the eight previous paragraphs, in certain example embodiments, the low-E coating may be heat treated following the exposing.

In addition to the features of any of the nine previous paragraphs, in certain example embodiments, the exposing may be performed in-line with the forming of the low-E coating.

In addition to the features of any of the 10 previous paragraphs, in certain example embodiments, the exposing may be performed from a side of the substrate on which the low-E coating is formed.

In addition to the features of any of the 11 previous paragraphs, in certain example embodiments, normal emissivity of the low-E coating may improve at least 9%, compared to the low-E coating in its as-deposited state.

In addition to the features of any of the 12 previous paragraphs, in certain example embodiments, the exposing may be performed so as to promote at least some recrystallization of each said silver-based layer.

In addition to the features of any of the 13 previous paragraphs, in certain example embodiments, the exposing may be a-thermal with respect to at least silver-based layer(s).

In certain example embodiments, a method of making a coated article is provided and comprises having a low-emissivity (low-E) coating on a glass substrate, with the low-E coating comprising at least one sputter-deposited silver-based layer, and with each said silver-based layer being sandwiched between one or more dielectric layers. The low-E coating is exposed to laser pulses having a duration of no more than 10-12 seconds and an energy density of at least 50 kW/cm2, the exposing being performed so as to avoid increasing temperature of the low-E coating to more than 300 degrees C. while also (a) reducing vacancies in each said silver-based layer, (b) reducing each said silver-based layer's refractive index, (c) increasing visible transmission of the low-E, and (d) reducing emissivity of the low-E coating compared to its as-deposited form and to a level sufficient to decouple a relationship between emissivity and sheet resistance reductions for the low-E coating.

In addition to the features of the previous paragraph, in certain example embodiments, each said silver-based layer may be provided over and contacting a respective layer comprising zinc oxide.

In addition to the features of either of the two previous paragraphs, in certain example embodiments, the laser pulses may have a duration of no more than 1 s, 10 s, or 100 s of femtoseconds.

In addition to the features of any of the three previous paragraphs, in certain example embodiments, normal emissivity of the low-E coating may improve at least 9%, compared to the low-E coating in its as-deposited state.

In addition to the features of any of the four previous paragraphs, in certain example embodiments, the exposing may be performed so as to promote at least some recrystallization of, and/or grain boundary reduction relative to, each said silver-based layer.

In addition to the features of any of the five previous paragraphs, in certain example embodiments, the exposing may be a-thermal with respect to at least silver-based layer(s).

In certain example embodiments, there is provided a coated article, comprising: a glass substrate; and a sputter-deposited low-emissivity (low-E) coating supported by the glass substrate, with the low-E coating including at least one silver-based layer provided over and contacting a layer comprising zinc oxide. The low-E coating is laser-treated with sub-picosecond laser pulses having an energy density of at least 50 kW/cm2 so as to remove vacancies in the silver-based layer(s) and twin grain boundaries between the silver-based layer(s) and adjacent underlying layer(s) comprising zinc oxide. The low-E coating has a post-laser treatment emissivity less than 0.02.

In addition to the features of the previous paragraph, in certain example embodiments, the coated article may be heat treatable with the low-E coating thereon.

In addition to the features of either of the two previous paragraphs, in certain example embodiments, the glass substrate may be soda lime silica glass.

In addition to the features of any of the three previous paragraphs, in certain example embodiments, the low-E coating may include at least first and second silver-based layers.

In addition to the features of any of the four previous paragraphs, in certain example embodiments, the layer(s) comprising zinc oxide may further comprise tin.

In certain example embodiments, an insulating glass unit is provided. It may include the coated article of any one of the five previous paragraphs; a substrate; and a spacer system provided around peripheral edges of the substrate helping to maintain the coated article and the substrate in substantially parallel spaced apart relation to one another.

While the invention has been described in connection with what is presently considered to be the most practical and preferred embodiment, it is to be understood that the invention is not to be limited to the disclosed embodiment and/or deposition techniques, but on the contrary, is intended to cover various modifications and equivalent arrangements included within the spirit and scope of the appended claims.

What is claimed is:

1. A method of making a coated article, the method comprising:
    having a low-emissivity (low-E) coating on a substrate, the low-E coating comprising at least one sputter-deposited silver-based layer and multiple dielectric layers; and
    exposing the low-E coating to laser pulses having a duration of no more than $10^{-12}$ seconds, comprising at least one wavelength from 355-500 nm, and an energy density of more than 30 kW/cm$^2$, the exposing being performed so as to avoid increasing temperature of the low-E coating to more than 300 degrees C. while also reducing (a) a number of grain boundaries with respect to said silver-based layer, (b) a number of vacancies in said silver-based layer, (c) said silver-based layer's refractive index, and (d) emissivity of the low-E coating compared to its as-deposited form.

2. The method of claim 1, wherein the silver-based layer has an Ag (111) particle size (nm) of at least 13.2 as measured via x-ray diffraction (XRD).

3. The method of claim 1, wherein the substrate is soda lime silica glass.

4. The method of claim 1, wherein the coating comprises first and second silver based layers, and wherein each said silver-based layer is provided over and contacting a respective layer comprising zinc oxide.

5. The method of claim 4, wherein each said layer comprising zinc oxide is substantially crystalline prior to the exposing.

6. The method of claim 1, wherein the low-E coating comprises a plurality of silver-based layers and the exposing is performed so as to alter the uppermost silver-based layer's texture more than that of the underlying silver-based layer(s).

7. The method of claim 1, wherein the laser pulses have an energy density of at least 50 kW/cm$^2$ and/or a duration on the order of 1 s, 10 s, or 100 s of femtoseconds.

8. The method of claim 1, further comprising heat treating the low-E coating following the exposing.

9. The method of claim 1, wherein the exposing is performed in-line with the forming of the low-E coating.

10. The method of claim 1, wherein the exposing is performed from a side of the substrate on which the low-E coating is formed.

11. The method of claim 1, wherein normal emissivity of the low-E coating is reduced by at least 9%, compared to the low-E coating in its as-deposited state.

12. The method of claim 1, wherein the exposing is performed so as to promote at least some re-crystallization of said silver-based layer.

13. The method of claim 1, wherein the exposing is a-thermal with respect to at least silver-based layer(s).

14. A method of making a coated article, the method comprising:
    having a low-emissivity (low-E) coating on a substrate, the low-E coating comprising at least one IR reflecting layer comprising silver and multiple dielectric layers; and
    exposing the low-E coating to laser pulses having a duration of no more than $10^{-12}$ seconds, the pulses comprising at least one wavelength from 355-500 nm and an energy density of more than 30 kW/cm$^2$,
    the exposing being performed so as to avoid increasing temperature of the low-E coating to more than 300 degrees C. while also reducing at least two of: (a) a number of grain boundaries with respect to said silver-based layer, (b) a number of vacancies in said silver-based layer, (c) said silver-based layer's refractive index, and (d) emissivity of the low-E coating compared to its as-deposited form.

15. The method of claim 14, the exposing being performed so as to avoid increasing temperature of the low-E coating to more than 300 degrees C. while also reducing at least three of: (a) a number of grain boundaries with respect to said silver-based layer, (b) a number of vacancies in said silver-based layer, (c) said silver-based layer's refractive index, and (d) emissivity of the low-E coating compared to its as-deposited form.

16. The method of claim 14, the exposing being performed so as to avoid increasing temperature of the low-E coating to more than 300 degrees C. while also reducing each of: (a) a number of grain boundaries with respect to said silver-based layer, (b) a number of vacancies in said silver-based layer, (c) said silver-based layer's refractive index, and (d) emissivity of the low-E coating compared to its as-deposited form.

17. The method of claim 14, the exposing being performed so as to increase visible transmission of the low-E coating compared to its as-deposited form.

18. The method of claim 14, wherein said IR reflecting layer comprising silver is located over and contacting a layer comprising zinc oxide.

19. The method of claim 14, wherein the laser pulses have a duration of no more than 1 s, 10 s, or 100 s of femtoseconds.

* * * * *